United States Patent [19]

Anderson et al.

[11] Patent Number: 5,564,094
[45] Date of Patent: Oct. 8, 1996

[54] RADIO RECEIVER PROVIDING REDUCED INTERMODULATION DISTORTION

[75] Inventors: George C. Anderson, Sunrise; Charles R. Ruelke, Davie; Randall S. Fraser, Plantation, all of Fla.

[73] Assignee: Motorola, Inc., Schaumburg, Ill.

[21] Appl. No.: 479,582

[22] Filed: Jun. 7, 1995

Related U.S. Application Data

[63] Continuation of Ser. No. 939,742, Sep. 2, 1992, abandoned.

[51] Int. Cl.⁶ ....................................................... H04B 1/10
[52] U.S. Cl. ............................ 455/295; 455/311; 455/343
[58] Field of Search ...................................... 455/295, 296, 455/302, 311, 245.2, 248.1, 251.1, 254, 268, 343

[56] References Cited

U.S. PATENT DOCUMENTS

| | | |
|---|---|---|
| 4,270,222 | 5/1981 | Menant .................................... 455/236 |
| 4,549,312 | 10/1985 | Michaels et al. ................... 455/295 X |
| 4,761,828 | 8/1988 | Rinderle .............................. 455/302 X |
| 4,907,293 | 3/1990 | Ueno ........................................ 455/295 |
| 5,001,776 | 3/1991 | Clark ....................................... 455/226 |
| 5,159,701 | 10/1992 | Barnes et al. ..................... 455/54.1 X |
| 5,214,391 | 5/1993 | Serizawa et al. ....................... 455/312 |
| 5,249,233 | 9/1993 | Kennedy et al. ................... 455/296 X |

*Primary Examiner*—Edward F. Urban
*Attorney, Agent, or Firm*—Barbara R. Doutre

[57] ABSTRACT

A radio receiver (10) comprises a plurality of stages and means for selectively adjusting the stages (16, 18, and 22), as a function of the received signal strength to reduce intermodulation distortion. In still another aspect of the invention, a receiver determines the signal strength of a received signal and uses this information to selectively control stages of the receiver in order to reduce the receiver's current drain.

6 Claims, 3 Drawing Sheets

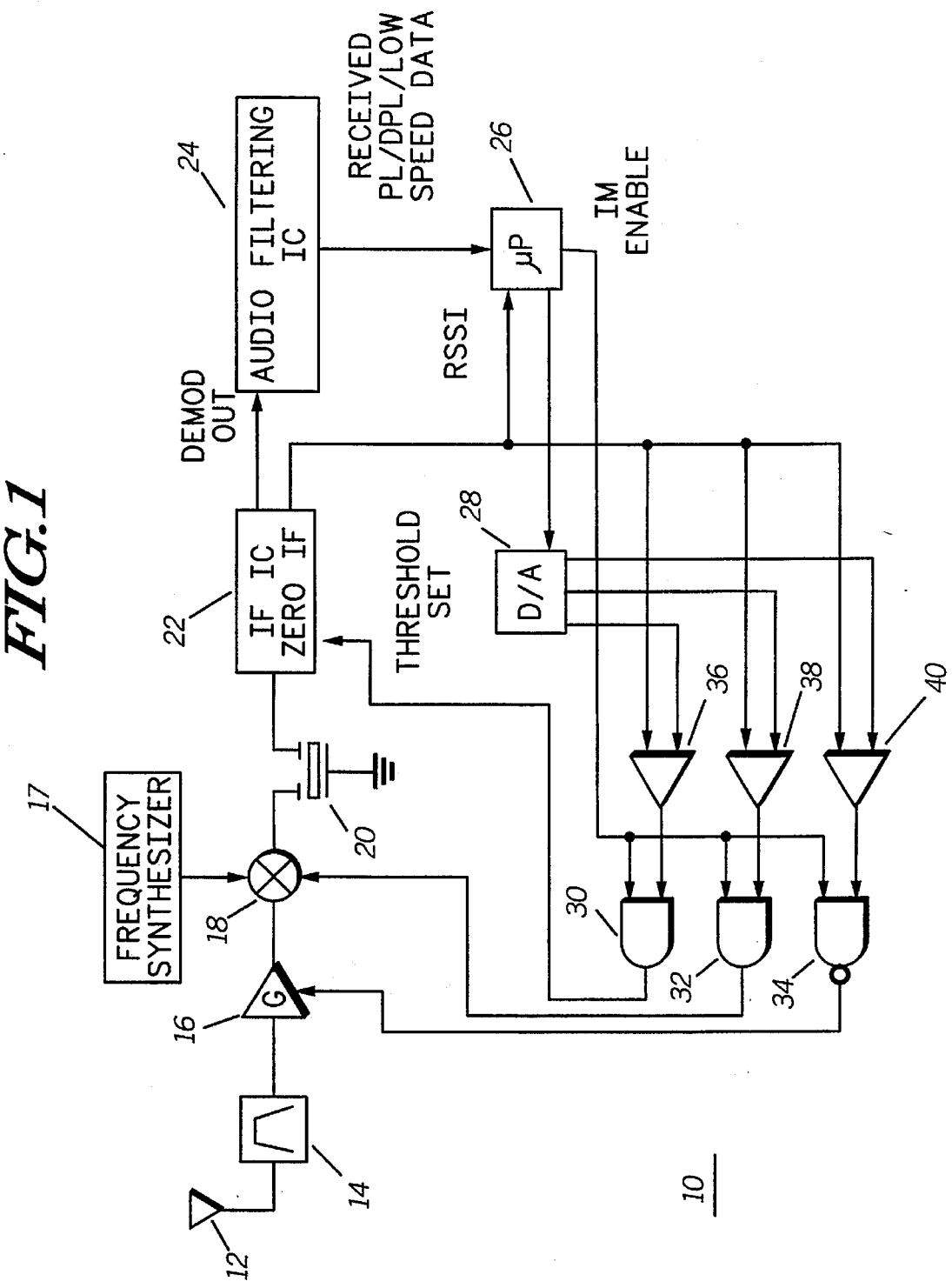

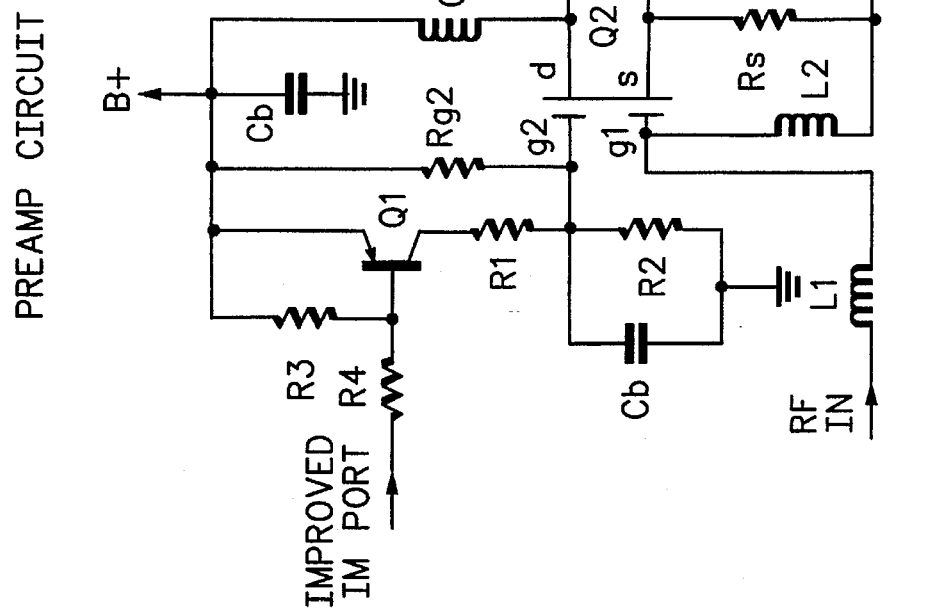
FIG.3 PREAMP CIRCUIT
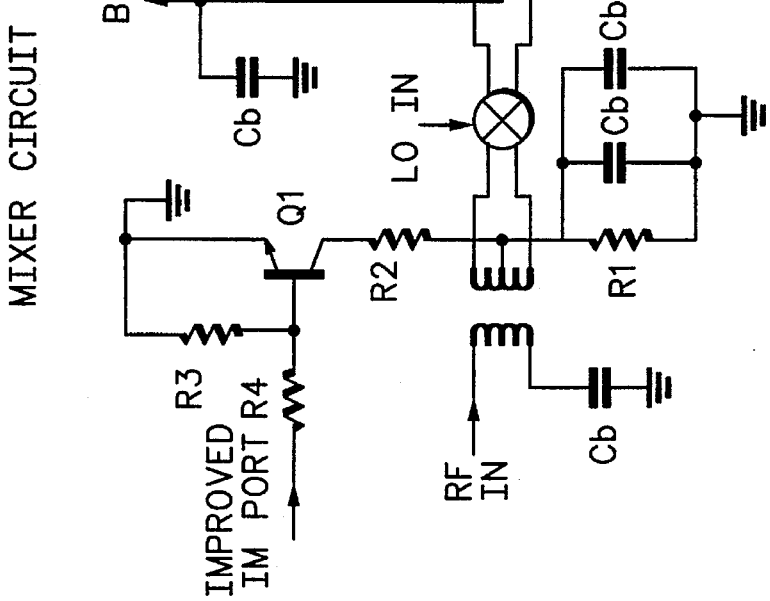
FIG.2 MIXER CIRCUIT 5,564,094

RADIO RECEIVER PROVIDING REDUCED INTERMODULATION DISTORTION

This is a continuation of application Ser. No. 07/939,742, filed Sep. 2, 1992, and now abandoned.

TECHNICAL FIELD

This invention relates generally to radio communications equipment.

BACKGROUND

Intermodulation (IM) is a common problem encountered in electronic communication devices. IM distortion occurs in mixers and other non-linear devices. IM distortion products are difficult to eliminate unless the frequencies for the mixing signal and the intermediate frequency are carefully chosen. Moreover, improving IM in both strong signal and weak signal conditions is also difficult. Another problem encountered with receivers and more specifically, with portable receivers, is the high amounts of current consumed by some receiver circuits.

Thus, a need exists for a communication device that overcomes the intermodulation problems of the prior art.

SUMMARY OF THE INVENTION

Briefly, according to the invention, a radio receiver comprises a plurality of stages and means for selectively adjusting at least one of the stages, as a function of the signal strength of a received signal to reduce intermodulation distortion.

In another aspect of the invention, the signals are coded signals and at least one of the plurality of stages of the radio receiver is adjusted once the received signal reaches a predetermined signal strength level and the radio receiver is not able to decode the coded signal.

BRIEF DESCRIPTION OF THE DRAWINGS

FIG. 1 is a basic block diagram of a RF receiver with an IM Detection and Auto-Correction Architecture in accordance with the invention.

FIG. 2 is a circuit schematic of the preamplifier circuit of FIG. 1.

FIG. 3 is a circuit schematic of the mixer circuit of FIG. 1.

DETAILED DESCRIPTION OF THE PREFERRED EMBODIMENT

Figure 4:
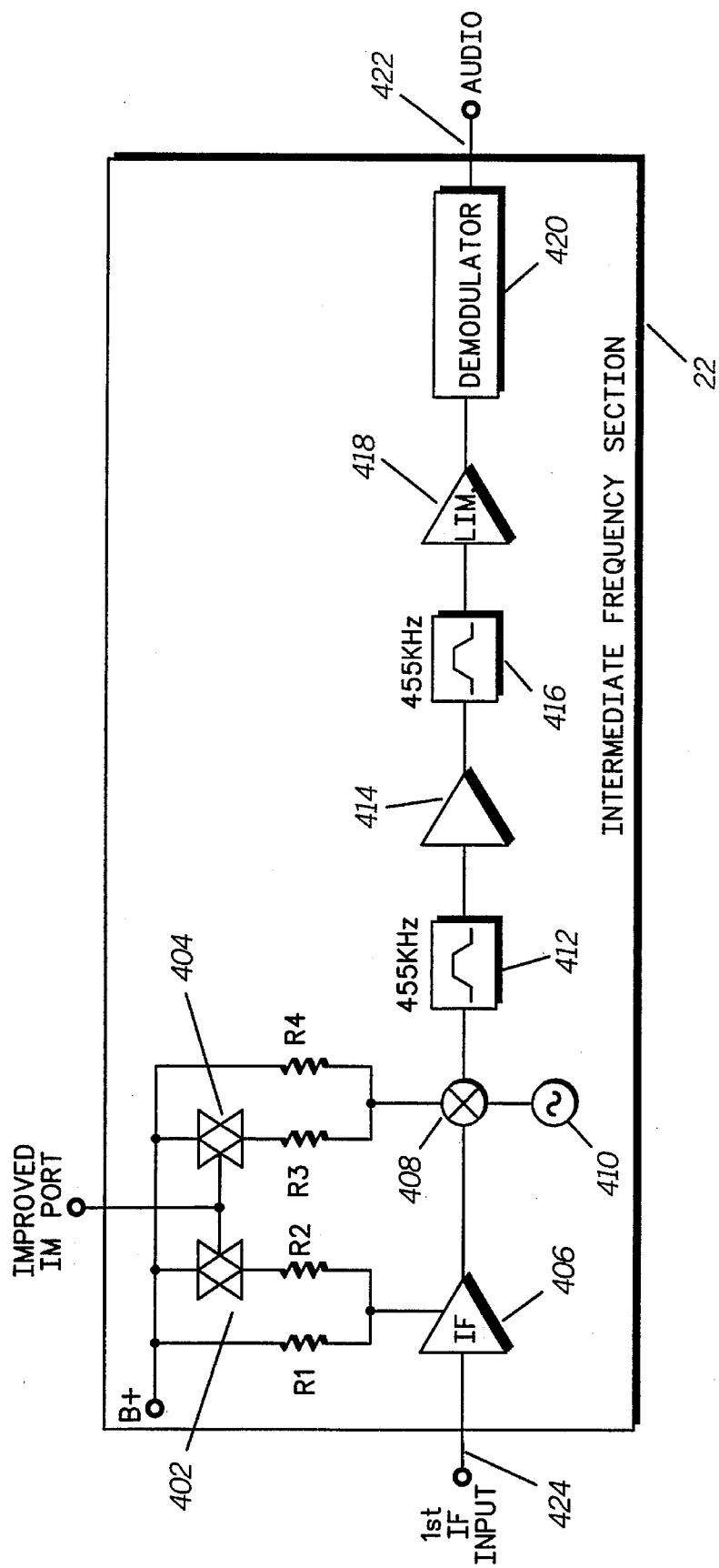
FIG. 4 is a block diagram of the IF section of FIG. 1.

Referring to FIG. 1, there is shown a basic block diagram of an RF receiver 10 with an IM Detection and Auto-Correction Architecture in accordance with the invention. The receiver 10 includes an antenna 12 for receiving radio signals. A filter 14 is a conventional bandpass filter for providing front end selectivity. A radio frequency (RF) preamplifier 16 amplifies the filtered receive signal. A mixer 18 receives the output of the amplifier 16 and multiplies it with an injection signal having a reference frequency, to provide an intermediate frequency (IF) signal. The injection signal can be supplied by a conventional frequency synthesizer 17. The IF signal is filtered by a crystal filter 20, and the resulting output signal is applied to an IF section 22 for further filtering and demodulation. The IF section 22 also includes received signal strength indication (RSSI) capability and an RSSI output. IF section 22 can be a zero IF (ZIF) section as known in the art.

The demodulated signal is then applied to an audio filter 24. The audio filter 24 recovers coded information signals (e.g., coded squelch signals (such as private line, digital private line), low speed data signals as found in trunked radio systems, or other types of coded signals. In this embodiment, the recovered coded squelch signal is provided to a controller means such as a microprocessor controller (µP) 26. The µP 26 also receives the RSSI signal from the IF section 22. The µp 26 preferably includes memory and input/output capabilities.

A digital to analog converter (D/A) 28 converts the digital signals provided by the µP 26 to corresponding analog levels for establishing threshold levels for activating IM distortion reduction measures in selected stages of the receiver. The D/A has three outputs, each being coupled to a negative input of three comparators 36, 38, and 40 for comparing each of the threshold levels with the RSSI measured by the IF section 22. The outputs of the comparators 36, 38, and 40 are coupled to AND gates 30, 32, and NAND gate 34, respectively, to control the provision of IM reduction signals to the selected stages. Each of the comparators 36, 38, and 40 can be programmed to different levels in order to control at what received signal strength signal level to enable the intermodulation signal (control signal) to each of the respective receiver stages.

In accordance with the invention, the µP determines whether the recovered coded squelch signals can be decoded. If the coded squelch signals cannot be decoded, it may be due to IM distortion or to insufficient signal strength. If the signal strength of the received signal is sufficient for normal coded squelch detect, but coded squelch is not detected, a condition exists where interference is corrupting the coded squelch data. This condition is likely to be caused by IM products and thus improved IM protection is required. Therefore, the µP compares the recovered coded squelch data and the RSSI signal to determine if improved IM protection is needed. The µP acts as both a signal strength determination means and a decoding means for the coded signals. If improved IM performance is needed, the µP 26 sends an IM enable command signal for activating/deactivating selected stages of the receiver 10. This allows for independently improving IM performance for individual receiver stages based on the RSSI thresholds set by the µP 26 via D/A 28.

By strategically selecting the order of which receiver stages are activated (by setting different RSSI thresholds for each of the stages), improved IM in both strong signal and weak signal conditions can be achieved. The µP must first set the RSSI thresholds for each stage based on a predefined algorithm. These threshold levels can be determined and programmed into µP 26 (stored in µp's memory section) during the manufacturing of receiver 10. Once the thresholds are set, the µP 26 can activate the IM improvement on an "as needed" basis, using the "IM Enable" port.

The decision to improve IM performance is accomplished based on the µP's ability to decipher coded squelch algorithm (regardless of whether the PL is programmed for an assigned radio channel), the µP 26 assumes proper receiver performance if the coded information signal is properly decoded and no corrective measures are taken. However, if the coded signal can not be properly deciphered and the RSSI is above the threshold, the µP assumes that IM distortion is corrupting the received carrier. The µP then causes the "IM Enable" line to go high, thereby enabling the array of AND gates (30 and 32 and NAND gate 34).

Any stage whose RSSI threshold is below the actual RSSI will generate a high from the appropriate comparator. Thus, if the "IM Enable" is high while a high is being generated by a particular stage's comparator, then that stage would be toggled into the improved IM mode. The improved IM mode is reached by the particular AND gate (30 and 32) or NAND gate 34 producing an IM control signal that allows for the particular receiver stage 16, 18 and 22 to go into an improved IM condition. If the coded signal is able to be deciphered, the new set of quiescent voltages are maintained. If no improvement is detected in deciphering the coded squelch, the receiver can be reprogrammed to the original (low current drain) quiescent voltages.

As discussed above, by determining at what RSSI levels to generate the control signals (IM control signals, as well as when to provide the IM enable signal enabling the AND and NAND gates) one can control which of the stages are adjusted and at what point in time they are adjusted. Some stages being adjusted prior to other stages, etc.

Examples of possible implementations of the invention are shown in FIGS. 2, 3 and 4. Referring to FIG. 3, there is shown a circuit schematic of the RF preamplifier circuit 16 of FIG. 1. The RF amplifier 16 includes a PNP bipolar transistor Q1 and a dual gate MOSFET Q2. By controlling gate 2 of the FET, IM of the amp can be improved while at the same time gain is reduced. Since gain is also reduced (a desirable condition in strong signal environments), the amp RSSI threshold is set highest (preferably, the RF amp is last to be toggled to the improved IM mode). When "IM ENABLE" is high and the output of comparator 40 is also high, the output of NAND gate 34 corresponding to amp 16 generates a "low" IM control signal at the IM improvement port of amp 16, thereby turning on Q1. The voltage divider R1/R2 then generates a new gate 2 voltage that improves third order input intercept point performance ("IP3", which is a standard IM performance measurement) from +0.5 to +6.0 dB and reduces gain from 12 to −1 dB in this specific example. Under nominal conditions (Q1 off), the voltages at gate 2 are set by voltage divider Rg2/R2.

Referring to FIG. 2, a mixer circuit incorporates a double balanced Gilbert Cell mixer. The improvement in IM of the mixer is achieved by reducing the equivalent source resistance which increases the mixers current drain. Under normal conditions, the mixer quiescent current is set by resistor R1. When the output of the mixer's AND gate 32 is "high" this IM control signal is placed at the IM improvement port which turns on transistor Q1 (preferably having a low Vsat=0.25 Vdc) which shunts resistor R2 in parallel with R1. This reduces the equivalent source resistance, thereby increasing the mixer quiescent current to improve IM. A typical IP3 improvement of 1 to 2 dB should be able to be realized by increasing the mixer's current drain in this fashion.

In FIG. 4, a block diagram of intermediate frequency section 22 is shown. IF section 22 includes an input port 424 for receiving the first IF signal. The IF signal is then passed through amplifier 406 before being mixed in mixer 408 with a local oscillator signal 410. The mixed signal is then sent through a filter 412, after which the filtered signal is amplified by gain stage 414 and then filtered again by filter stage 416. The signal is then limited by limiter 418 before the signal is sent to demodulator 420 for demodulation. The audio signal is then presented at output port 422.

Enabling the improved IM port ( IM control signal is "high" from AND gate 30) improves the IM performance of the IF section by enabling switches 402 and 404 which places resistor R2 in parallel with resistor R1, and resistor R4 in parallel with resistor R3. This effectively lowers the source resistance on amplifier stage 406 and mixer stage 408, providing for a greater amount of supply current to the devices. This reduction in the equivalent source resistance, thereby increases the current to mixer 408 and amplifier 406 stages to improve IM performance.

In a typical operational example, if the received signal is very strong (e.g., above −40 dBM), the gain of amplifier 16 would be reduced as much as possible, while mixer 18 and IF stage 22 would receive maximum current (IM control signals "high" to stages 18 and 22). If the received signal shows a signal strength indication of between approximately −45 to −80 dBM (moderate signal conditions), IF stage 22 would operate in the high current mode (IM control signal applied), mixer 18 is set to its low current mode (high sensitivity, IM control signal not applied) and the gain of pre-amplifier 16 is set to a gain of approximately one (IM enable port "high").

Those skilled in the art will appreciate that there are many ways of putting the receiver stages into an improved IM state depending on the particular design of each of the receiver stages. Although preferably, given current drain considerations (especially in battery powered receivers), the improved IM state is preferably reached by increasing the current provided to the selected stages. In this way, the current drain of the receiver is maintained as low as possible and is only increased during periods when IM distortion needs to be corrected. Also, the sequence in which the stages are placed into improved IM states will depend on many factors, such as the design of the receiver, the condition of the received signals, etc.

The present invention provides for a receiver which can detect IM interference and dynamically adjust the receiver stages to compensate for possible degradation in performance. This provides for a receiver which can reduce the external effect of interference and provides for improved user satisfaction. Battery life of the receiver can be extended in the case of a portable receiver since improved IM performance, which typically requires higher receiver current drain, can be automatically disengaged when not required. The invention also provides for improved spectrum utilization by reducing the need to stagger users channel assignments which is typically done to minimize adjacent channel and IM interference in some systems.

What is claimed is:

1. A radio receiver for receiving a radio signal on a given channel, the radio signal having an audio signal with a coded information signal, comprising:

a plurality of stages;

a demodulator for recovering the audio signal;

a filter for recovering the coded information signal from the audio signal;

a decoder means for decoding the coded information signal;

means for determining if the decoder means was successful or unsuccessful in decoding the coded information signal;

means for selectively adjusting, over a continuous range of the received radio signal on the given channel, predetermined operating parameters of at least one of the plurality of stages as a function of the received signal strength of the received signal to reduce intermodulation distortion;

wherein the predetermined operating parameters of at least one of the plurality of stages is adjusted if the signal strength of the received signal has reached a predetermined level and the decoder means was unsuccessful in decoding the coded information signal;

wherein the decoder means re-decodes the coded information signal after the at least one of the plurality of stages is adjusted; and wherein the predetermined operating parameters of the at least one of the plurality of stages remains adjusted if the decoder means was successful in re-decoding the coded information signal, indicating that intermodulation distortion had occurred; and the predetermined operating parameters of the at least one of the plurality of stages is re-adjusted back to its pre-adjusted settings if the decoder was unsuccessful in re-decoding the coded information signal, indicating that intermodulation distortion had not occurred.

2. A radio receiver as defined in claim 1, wherein the plurality of stages is selected from the group consisting of amplifier stage, mixer stage and intermediate frequency stage.

3. A radio receiver as defined in claim 1, wherein the coded information signal comprises a low speed data signal.

4. A radio receiver as defined in claim 1, wherein the coded information signal comprises a coded squelch signal.

5. A radio receiver as defined in claim 1, wherein the coded information signal is a digital coded squelch signal.

6. A radio receiver as defined in claim 1, wherein each of the plurality of stages has a corresponding signal strength threshold level and the means for selectively adjusting predetermined operating parameters of at least one of the plurality of stages does not adjust any of the plurality of stages which has a corresponding signal strength threshold level which is greater than the received signal strength of the received signal.

* * * * *